Aug. 18, 1936.  H. KATTEN  2,051,485
RADIATOR
Filed Sept. 20, 1935
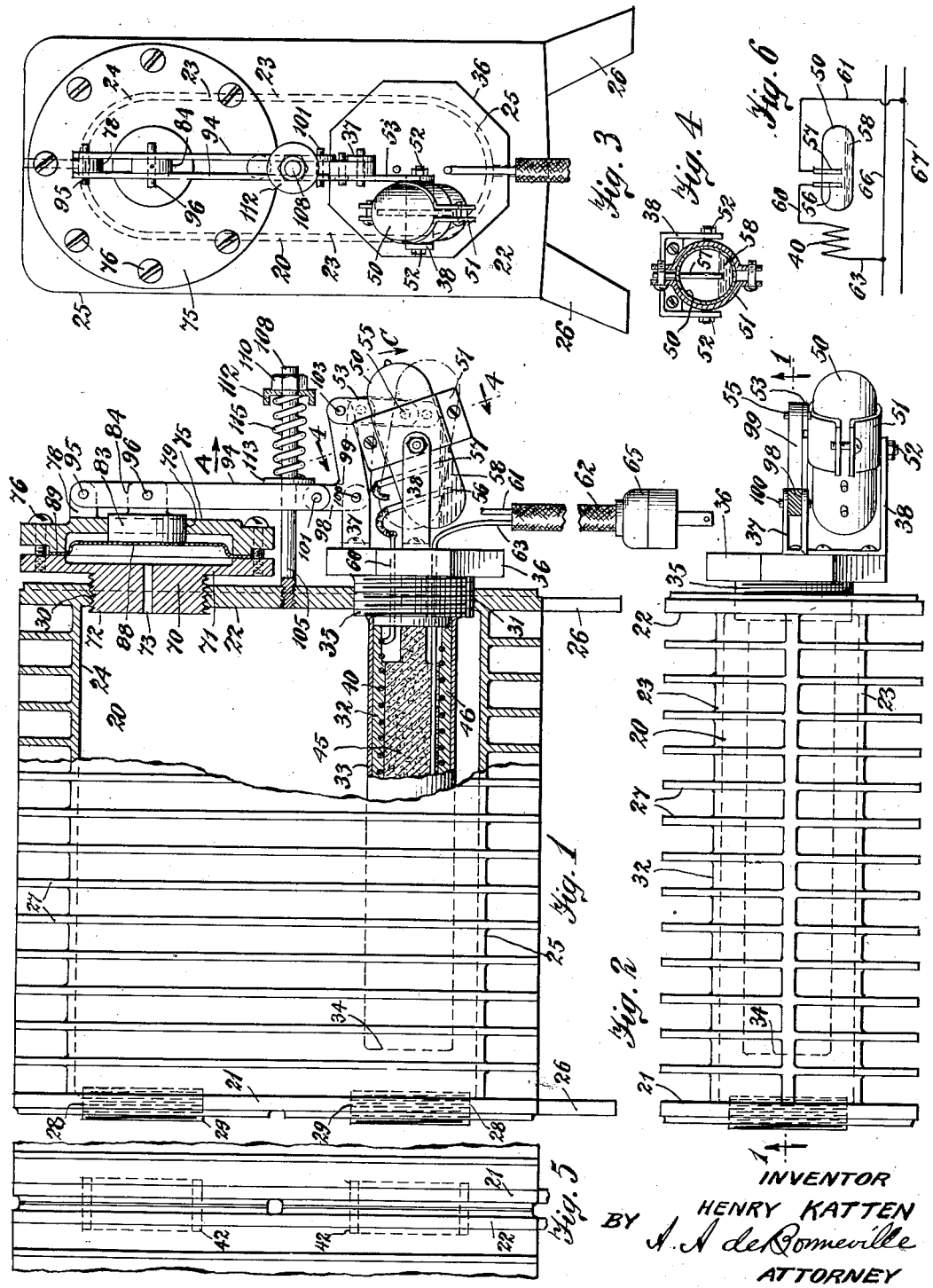
INVENTOR
HENRY KATTEN
BY A. A. de Bonneville
ATTORNEY Patented Aug. 18, 1936

2,051,485

UNITED STATES PATENT OFFICE 2,051,485

RADIATOR

Henry Katten, New York, N. Y.

Application September 20, 1935, Serial No. 41,357

3 Claims. (Cl. 219—38)

This invention relates to a radiator.

The object of the invention is the production of a radiator with a heating element, which is automatically controlled by the pressure of the steam in said radiator.

The second object of the invention is the production of a plurality of radiators, which can easily be connected to produce the requisite amount of heating surface for various requirements.

The third object of the invention is the production of a radiator which is portable, and which does not require refilling after a predetermined amount of water has been supplied thereto, and in which air valves and safety valves are not required.

The fourth object of the invention is the production of a radiator, having a body which can be used with a central heating system of steam or hot water, and which can also be used independently, with its own heating means.

In the accompanying drawing Fig. 1 represents a side elevation of an exemplification of my automatically operated radiator and a partial section of Fig. 2 on a plane indicated by the line 1, 1; Fig. 2 shows a top view of Fig. 1 with an element in section; Fig. 3 indicates a right hand view of Fig. 1; Fig. 4 shows a section of Fig. 1 on the line 4, 4; Fig. 5 represents a side elevation of a fragmentary portion of a pair of the radiators connected to each other and Fig. 6 shows a wiring diagram for the electric appurtenances of the radiator.

The body of the radiator comprises the oval shaped shell 20 having the end walls 21, 22, the side walls 23, the top wall 24 and the bottom wall 25. Legs 26 extend from the bottom wall 25. Fins 27 extend from the side walls, top wall and bottom wall of the shell 20.

In threaded openings 28 in the wall 21 are shown the screw plugs 29, and in the wall 22 are indicated the threaded openings 30 and 31.

In the shell 20 is positioned an electric heating element designated in its entirety by the numeral 32. The element 32 comprises the cylindrical shell 33, closed at one of its ends 34 and has the threaded boss 35 integral with its other end.

The boss 35 is in threaded engagement with the threaded openings 31 in the end wall 22 of the shell of the radiator. An eight sided projection 36 extends from the boss 35 and is integral therewith. A U shaped bracket 37 is fastened to the upper portion of the projection 36, and a U shaped bracket 38 is also fastened to the projection 36 below the bracket 37.

In the shell 33 of the heating element is shown the coil of wire 40. An insulating coil 45 in the shell 33 supports the coil 40 and insulating material 46 surrounds said coil.

The body portion of a mercury switch is indicated having the cylindrical shaped glass shell 50, which is supported in the pair of clamps 51. The latter are pivoted to the bracket 38 by means of the pivot screws 52. A link 53 has one end pivoted to one of the clamps 51 on the pivot 55. The terminals of the electric switch are indicated at 56 and 57. The mercury in the shell 50 is shown at 58. A wire 60 connects one end of the coil 40 and the terminal 56, and a wire 61 of the heater cord 62 is connected to the terminal 57. A wire 63 of the heater cord is connected to the other end of the coil 40.

A wall plug 65 is provided for the heater cord 62 for the source of electric current.

A diaphragm housing is indicated in its entirety by the numeral 70 and comprises the inner member 71 having the threaded boss 72, with the central opening 73. The said housing is also provided with the outer member 75, which latter is clamped to the member 71, by means of the screws 76. The member 75 has integral therewith the journal lug 78 and the guide opening 79 for the actuating plug 83. The latter has integral therewith the projection 84. A flexible diaphragm 88 has its circumferential off-set portion 89 clamped between the members of the diaphragm housing 70.

A pair of links 94 have each its upper end pivoted to the journal lug 78 by means of the pivot 95. The projection 84 is pivoted to the links 94 by means of the pivot 96. A bell crank is indicated having the arms 98 and 99, and is pivoted to the U shaped bracket 37 by means of the pivot 100. The arm 98 is pivoted to the links 94 by means of the pivot 101 and the arm 99 is pivoted to the link 53 by means of the pivot 103.

A spring supporting post 105 has the threaded end 108 for the nut 110 and its other end is in threaded engagement with the wall 22 of the shell 20. The said post 105 extends between the links 94. A spring cap 112 and the washer 113 are supported on the post 105 for the helical spring 115.

Referring to Fig. 5, a fragmentary portion of a pair of the radiators are indicated with the wall 21 of one radiator adjacent to and connected to the wall 22 of a second radiator, by means of the screw nipples 42 for a central heating system. It will be noted that the number of radiators connected to one another can comprise any number of them as required.

Referring to the wiring diagram shown in Fig. 6, the shell of the mercury switch is again indicated at 50 with its mercury 58. The terminals of the switch are again shown at 56 and 57. The coil 40 of the heating element is shown with the wire 60 connecting it to the terminal 56. The wires of the heater cord 62 are again indicated at 61 and 63. The wire 61 is connected to the terminal 57. The source of electric current is indicated by the wires 66 and 67, which are respectively connected to the wires 63 and 61.

The radiator with the electric heating element is charged with a predetermined quantity of water through one of the openings 28 by removing its plug 29, after which the said plug is again screwed in position. The wall plug 65 is connected with a wall plate, not shown, to furnish the electric current for the heating element. The coil of wire 40 of the electric heating element 32 is thereby energized when the glass shell 50 is in its tilted position, as shown in Fig. 1, and the water in the shell 20 is vaporized into steam. When a predetermined steam pressure is exceeded, the steam flowing through the opening 73 flexes the diaphragm 88, and thereby the links 94 swing on the pivot 95 in the direction of the arrow A against the tension of the spring 115. By this means the bell crank arm 99 is swung down, and the shell 50 is swung in the direction of the arrow C. By this means the lower ends of the terminals 56 and 57 are spaced from the mercury 58 in the shell 50, which opens the electric circuit of the heating element 32, and thereby no further heat is imparted to the water in the shell 20. The pressure of steam in the radiator drops until the tension of the spring 115 again positions the shell 50 in its tilted position, as shown in the drawing, to contact the mercury 58 in said shell with the terminals 56 and 57 to again energize the electric heating element 32.

Various modifications may be made in the invention and the present exemplifications are to be taken as illustrative and not limitative thereof.

Having described my invention, I claim:

1. In a radiator the combination of a body portion comprising a shell, an electric heating element detachably positioned in the shell having a portion thereof extending out of said shell, a U shaped bracket extending from said portion, a second U shaped bracket extending from said portion, a glass shell of a mercury switch adjacent to said portion, said switch coacting with said heating element, a pair of clamps encircling and supporting said shell pivoted to the said second U shaped bracket, a link having one end pivoted to one of said pair of clamps, a bell crank pivoted to said first U shaped bracket, one of the arms of the bell crank pivoted to the other end of said link and means to swing the bell crank with a predetermined pressure in the shell of the radiator to open the electric circuit of the heating element.

2. In a radiator the combination of a body portion comprising a shell, an electric heating element detachably positioned in the shell, a coil of wire for said element, a mercury switch having a shell outside of the shell of the radiator and pivoted to one end of said element, mercury in the shell of the switch, a pair of terminals for the switch extending into the mercury therein when the shell of the switch is in a predetermined position, one of said terminals in connection with one end of the coil of wire of said heating element, the other terminal in connection with a source of electric current, the other end of said coil in connection with said source of electric current, a diaphragm coacting with the pressure of steam in the radiator, connections between said radiator and the shell of the switch to tilt the latter at a predetermined pressure in the radiator, in position to open the circuit of said electric circuit of said heating element and means to close said circuit.

3. In a radiator the combination of a shell comprising side walls, end walls, a top wall and bottom wall, means to charge said shell with water to be heated, an electric heating element detachably positioned within the shell, a projection of said heating element extending outside of the shell, a U shaped bracket extending from said projection, a second U shaped bracket extending from said projection below the first bracket, a bell crank pivoted to the first U shaped bracket, a mercury switch pivoted to said second bracket, a link having one end pivoted to the mercury switch, a diaphragm housing connected to the shell of the radiator, said housing having an opening leading to the interior of the said shell, a flexible diaphragm supported in said housing opposite said opening, a pair of links each having one end pivoted to said housing, the lower ends of said links pivoted to one of the arms of said bell crank, the other arm of the bell crank pivoted to the link of the mercury switch, a plug extending into the diaphragm housing and having one end pivoted to the links of said housing, a spring post extending from the shell of the radiator through the links of said housing, a spring seat at the outer end of said post and a washer at the other end bearing against said pair of links, a spring encircling said post, bearing between said seat and washer, and means to energize the electric heating element, to vaporize the water introduced in the shell of the radiator, the steam in the shell when at a predetermined pressure flexing said diaphragm and tilting said mercury switch to open the electric circuit of the electric heating element.

HENRY KATTEN.